(12) United States Patent
Wang et al.

(10) Patent No.: US 8,163,340 B2
(45) Date of Patent: Apr. 24, 2012

(54) CARBON NANOTUBE FILM STRUCTURE AND METHOD FOR MAKING THE SAME

(75) Inventors: Xue-Shen Wang, Beijing (CN); Qun-Qing Li, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 464 days.

(21) Appl. No.: 12/243,059

(22) Filed: Oct. 1, 2008

(65) Prior Publication Data

US 2009/0197038 A1    Aug. 6, 2009

(30) Foreign Application Priority Data

Feb. 1, 2008    (CN) .......................... 2008 1 0066048

(51) Int. Cl.
*C23C 16/00*    (2006.01)
(52) U.S. Cl. .................................. 427/249.1; 427/248.1
(58) Field of Classification Search ............... 427/248.1, 427/249.1
See application file for complete search history.

(56) References Cited

U.S. PATENT DOCUMENTS

| 2005/0181143 | A1* | 8/2005 | Zhang et al. ................... 427/532 |
| 2008/0075954 | A1* | 3/2008 | Wardle et al. ................. 428/339 |
| 2008/0297022 | A1 | 12/2008 | Maruyama et al. |

FOREIGN PATENT DOCUMENTS

| CN | 1865131 A | 11/2006 |
| JP | 2006-27961 | 2/2006 |
| TW | I343591 | 6/2011 |

OTHER PUBLICATIONS

Suo-Hong Zhang, The quantum transport of carriers in carbon nanotubes and electrostatic induced electronic devices, May 31, 2006, Taiwanese.

* cited by examiner

*Primary Examiner* — Kelly M Gambetta
(74) *Attorney, Agent, or Firm* — Altis Law Group, Inc.

(57) ABSTRACT

A carbon nanotube film structure includes at least one carbon nanotube film or at least two stacked carbon nanotube films. Each carbon nanotube film includes a plurality of ultralong carbon nanotubes parallel to the surface of the carbon nanotube film and parallel to each other. A length of the ultralong carbon nanotube is equal to or greater than 1 centimeter. The invention is also related to a method for making the above-described carbon nanotube film structure.

20 Claims, 3 Drawing Sheets

---

Providing a growing device, the growing device comprising a reacting room having a gas inlet and a gas outlet, a growing substrate, a receiving substrate, a rotatable supporter disposed in the reacting room and a second supporter disposed in the reacting room closer to the gas inlet than the rotatable supporter, wherein a catalyst layer is located on the growing substrate

↓

Placing the growing substrate on the second supporter, and placing the receiving substrate on the rotatable supporter

↓

Growing ultralong carbon nanotubes, wherein growing carbon nanotubes comprises the steps of introducing a carbonaceous gas along a gas flow direction and stopping introducing the carbonaceous gas

↓

Changing the growing substrate, and growing more ultralong carbon nanotubes to form at least two carbon nanotube films on the receiving substrate Providing a growing device, the growing device comprising a reacting room having a gas inlet and a gas outlet, a growing substrate, a receiving substrate, a rotatable supporter disposed in the reacting room and a second supporter disposed in the reacting room closer to the gas inlet than the rotatable supporter, wherein a catalyst layer is located on the growing substrate Placing the growing substrate on the second supporter, and placing the receiving substrate on the rotatable supporter Growing ultralong carbon nanotubes, wherein growing carbon nanotubes comprises the steps of introducing a carbonaceous gas along a gas flow direction and stopping introducing the carbonaceous gas Changing the growing substrate, and growing more ultralong carbon nanotubes to form at least two carbon nanotube films on the receiving substrate

FIG. 2

CARBON NANOTUBE FILM STRUCTURE AND METHOD FOR MAKING THE SAME

BACKGROUND

1. Field of the Invention

The invention generally relates to films of nano materials and methods for making the same, particularly, to a carbon nanotube film structure and a method for making the same.

2. Discussion of Related Art

Carbon nanotubes (CNTs) produced by means of arc discharge between graphite rods were discovered and reported by Sumio Iijima in 1991. CNTs are electrically conductive along their length, chemically stable, and each can have a very small diameter (much less than 100 nanometers) and large aspect ratios (length/diameter). Due to these and other properties, it has been suggested that CNTs can play an important role in manufacturing filters.

Applications of carbon nanotubes are rather restricted due to the carbon nanotubes made by the conventional method being generally grainy or powdery in macrostructure. Therefore, more and more attention is being given to develop new and various carbon nanotube macrostructures.

A conventional method for making a carbon nanotube film structure includes the following steps. Firstly, providing a growing substrate. Secondly, forming a catalyst layer on the growing substrate. Thirdly, providing a reacting furnace, and placing the growing substrate with catalyst layer into the reacting furnace. Finally, introducing a carbonaceous gas and heating the reacting furnace to grow carbon nanotube film structure. The carbon nanotube film structure made by the above-described method is formed on the growing substrate and includes a plurality of carbon nanotubes. The carbon nanotubes are entangled with each other and distribute in the carbon nanotube film structure disorderly.

However, some drawbacks arise from the conventional carbon nanotube film structure and method for making the same. Firstly, due to the carbon nanotubes in the carbon nanotube film structure being entangled with each other and distributed in a disorderly manner, the excellent properties of the carbon nanotubes are poorly utilized. Secondly, applications of the carbon nanotube film structure are restricted because the carbon nanotube film structure is not a free-standing structure and must be formed on a substrate. Thirdly, the method introduces catalysts into the carbon nanotube film structure during the forming process, thereby reducing the purity of the carbon nanotube film structure. Fourthly, it is hard to recycle the substrate for use in mass production.

What is needed, therefore, is a carbon nanotube film structure with high purity and a method for making the same.

BRIEF DESCRIPTION OF THE DRAWINGS

Many aspects of the present carbon nanotube film structure and the method for making the same can be better understood with references to the attached drawings. The components in the drawings are not necessarily drawn to scale, the emphasis instead being placed upon clearly illustrating the principles of the present carbon nanotube film structure and the method for making the same.

FIG. 2 is a flow chart of a method for making the carbon nanotube film structure shown in FIG. 1.

Figure 1:
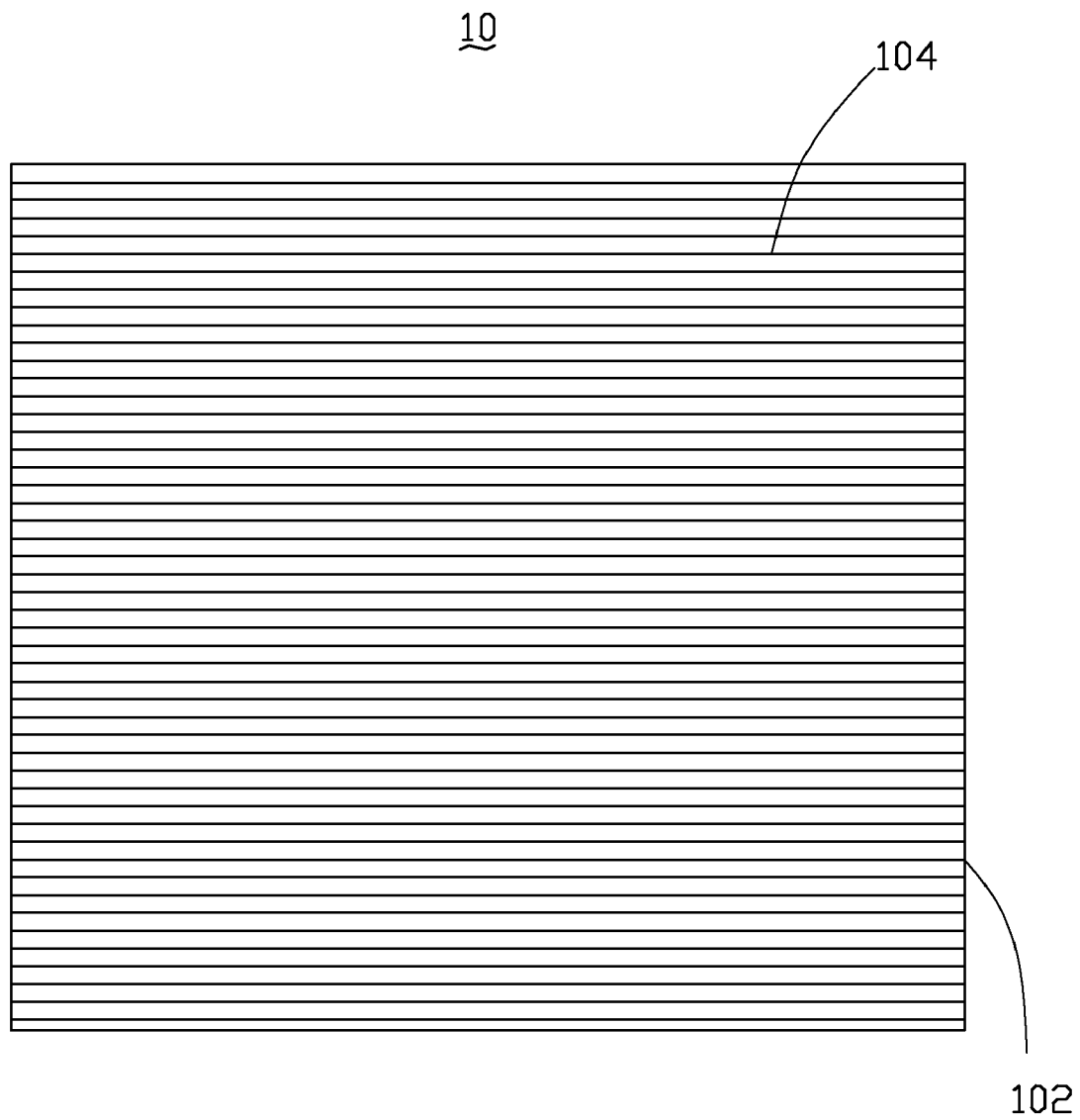
FIG. 1 is a schematic view of a carbon nanotube film structure in accordance with the present embodiment.

Corresponding reference characters indicate corresponding parts throughout the several views. The exemplifications set out herein illustrate at least one present embodiment of the carbon nanotube film structure and the method for making the same, in at least one form, and such exemplifications are not to be construed as limiting the scope of the invention in any manner.

DETAILED DESCRIPTION OF EXEMPLARY EMBODIMENTS

References will now be made to the drawings, in detail, to describe embodiments of the carbon nanotube film structure and the method for making the same.

Referring to FIG. 1, a carbon nanotube film structure 10 is provided in the present embodiment. The carbon nanotube film structure 10 includes one carbon nanotube film 102 or at least two stacked carbon nanotube films 102. A thickness of the carbon nanotube film 102 approximately ranges from 10 nanometers to 100 micrometers. The carbon nanotube film 102 includes a plurality of parallel ultralong carbon nanotubes 104 all of similar length greater than 1 centimeter, and arranged parallel to the surface of the carbon nanotube film 102. The adjacent ultralong carbon nanotubes 104 in the same carbon nanotube film 102 may be in contact with each other or be separated by a distance of up to 5 micrometers. The ultralong carbon nanotubes 104 in the carbon nanotube film 102 are selected from the group comprising single-walled carbon nanotubes, double-walled carbon nanotubes, and multi-walled carbon nanotubes. A diameter of each single-walled carbon nanotube approximately ranges from 0.5 to 50 nanometers. A diameter of each double-walled carbon nanotube approximately ranges from 1 to 50 nanometers. A diameter of each multi-walled carbon nanotube approximately ranges from 1.5 to 50 nanometers.

In the present embodiment, the thickness of the carbon nanotube film 102 is 10 micrometers. The adjacent ultralong carbon nanotubes 104 in the same carbon nanotube film 102 contact to each other and connect to each other by van der Waals attractive force therebetween. The length of the ultralong carbon nanotubes 104 is 10 centimeters.

When the carbon nanotube film structure 10 includes at least two stacked carbon nanotube films 102, any two adjacent carbon nanotube films 102 connect to each other by means of van der Waals attractive force therebetween. The orientation of the ultralong carbon nanotubes 104 in any one carbon nanotube film 102 is substantially uniform, and orientation of the nanotubes 104 may be selected such that an angle α is formed relative to the orientation of the nanotubes 104 in adjacent films 102. The greater the angle between 0° and 90°, the greater the diameters of micropores formed therebetween will be. While the α□0, the ultralong carbon nanotubes 104 in the carbon nanotube film structure 10 cross with each other to form a micropore structure. Diameters of the micropores will approximately range from 1 micrometer to 5 micrometers and can be selected according to need. The micropore structure is useful when the carbon nanotube film structure 10 is applied to a membrane electrode assembly of fuel cell or an anode of a lithium-ion battery.

The carbon nanotube film structure 10 includes the following advantages. Firstly, the carbon nanotube film structure 10 has excellent electrical and thermal conductivity, because of the ultralong carbon nanotubes 104. Secondly, the carbon nanotube film structure 10 is a free-standing structure, so it is convenient to use. Thirdly, the carbon nanotube film structure 10 is a pure film structure and free of catalysts, so it has a wide application scope.

Figure 3:
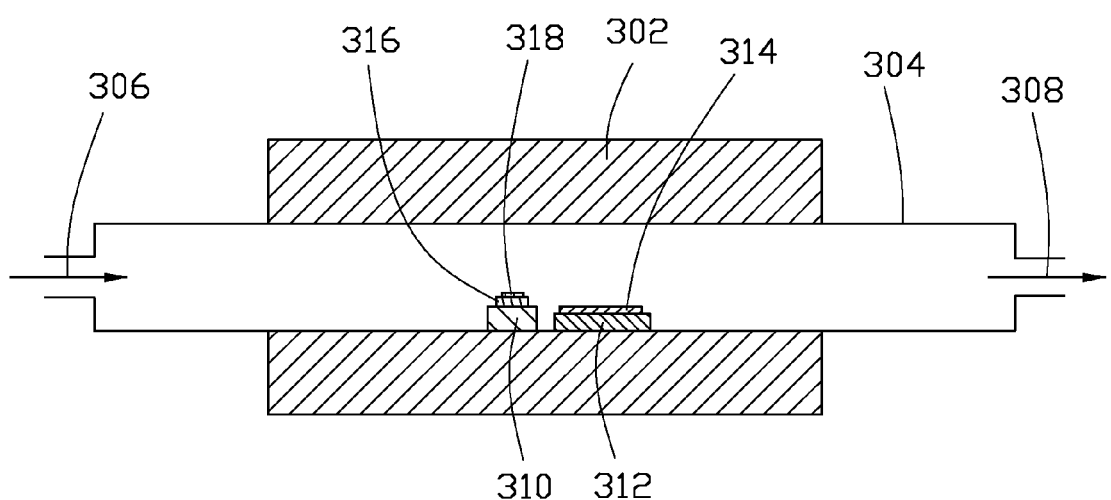
FIG. 3 is a schematic view of a growing device used to making the carbon nanotube film structure shown in FIG. 1.

Referring to FIGS. 1, 2 and 3, a method for making the above-described carbon nanotube film structure 10 is provided in the present embodiment. The method includes the steps. Firstly, providing a growing device 30, the growing device 30 comprising a reacting room 304 having a gas inlet 306 and a gas outlet 308, a growing substrate 316, a receiving substrate 314, a rotatable supporter 312 disposed in the reacting room 304 and a second supporter 310 disposed in the reacting room 304 closer to the gas inlet 306 than the rotatable supporter 312, wherein a catalyst layer 318 is located on the growing substrate 316. Secondly, placing the growing substrate 316 on the second supporter 310, and placing the receiving substrate 314 on the rotatable supporter 314. Thirdly, growing ultralong carbon nanotubes, wherein growing carbon nanotubes comprises the steps of introducing a carbonaceous gas along a gas flow direction and stopping introducing the carbonaceous gas. Finally, changing the growing substrate 316, and growing more ultralong carbon nanotubes to form at least two carbon nanotube films 102 on the receiving substrate 314.

In the step (a), the distance between the rotatable supporter 312 and the second supporter 310 is less than 1 micrometer. The rotatable supporter 312 is lower than the second supporter 310. The rotatable supporter 312 can rotate in the horizontal plane arbitrarily.

The growing substrate 316 and receiving substrate 314 is made of high melting materials. The melting point of the growing substrate 316 and receiving substrate 314 is above the growing temperature of the ultralong carbon nanotubes 104. The shape and area of the growing substrate 316 and receiving substrate 314 is arbitrary.

The growing substrate 316 can be a rectangle. The length of the growing substrate 316 approximately ranges from 1 centimeter to 10 centimeters and the width of the growing substrate 316 approximately ranges from 1 millimeter to 5 millimeters. In the present embodiment, the growing substrate 316 is a silicon strip. The length of the growing substrate 316 is 10 centimeters and the width of the growing substrate 316 is 1 millimeter. The growing substrate 316 can be made by the steps of forming a catalyst layer 318 on a large wafer, and then cutting the large wafer into a number of silicon strips of predetermined size.

The receiving substrate 314 can be a square. The length of side of the receiving substrate 314 approximately ranges from 1 centimeter to 10 centimeters. Also, the receiving substrate 314 can be a network, such as copper wire mesh. In the present embodiment, the receiving substrate 314 is a 4-inch wafer.

In the step (a), the catalyst layer 318 includes a layer of monodisperse catalyst. The method of forming the catalyst layer 318 depends on the material of the monodisperse catalyst. While the catalyst is made of iron (Fe), cobalt (Co), nickel (Ni), or any alloy thereof, the process of forming the catalyst layer 318 on the growing substrate 316 includes the following substeps of: (a1) depositing a layer of monodisperse catalyst on the growing substrate 316; (a2) patterning the layer of monodisperse catalyst to form a patterned catalyst layer 318. The method of depositing the catalyst layer 318 is selected from the group comprising of physical vapor deposition (PVD), chemical vapor deposition (CVD), coating and plating. The thickness of the catalyst layer 318 approximately ranges from 1 nanometer to 3 nanometers. Due to the thickness of the catalyst layer 318 being small, the catalyst materials in the catalyst layer 318 forms a plurality of monodisperse catalyst particles.

While the catalyst layer 318 is made of monodisperse solution of metal or metal-salt, the process of forming the catalyst layer 318 on the growing substrate 316 includes the following substeps of: (a1') applying a monodisperse solution onto the surface of the growing substrate 316 to form a layer of monodisperse solution; (a2') drying the monodisperse solution layer to form a catalyst layer 318. The step (a1') can be replaced by dipping the growing substrate 316 into the monodisperse solution. It could avoid the catalyst materials to gather together by using monodisperse solution to form catalyst layer 318. Therefore, the catalyst layer 318 includes a plurality of monodisperse catalyst particles. The diameter of the monodisperse catalyst particles depends the concentration of the monodisperse solution. The monodisperse solution of metal-salt can be selected from the group comprising a solution of Fe(NO3)3 and water, solution of CuCl2 and water, solution of FeCl3 and water, solution of Fe(NO3)3 and ethanol, solution of CuCl2 and ethanol, and solution of FeCl3 and ethanol. The monodisperse solution of metal is selected from the group comprising a solution of Fe—Mo and n-octane, solution of Fe—Co and n-octane, solution of Fe—Ru and n-octane, solution of Fe—Mo and hexane, solution of Fe—Co and hexane, solution of Fe—Ru and hexane, solution of Fe—Mo and ethanol, solution Fe—Co and ethanol, and solution of Fe—Ru and ethanol. In the present embodiment, the catalyst layer 318 is formed by a solution of Fe(NO3)3 and ethanol.

In the step (b), while placing the growing substrate 316 on the second supporter 310, it is necessary to make sure the catalyst layer 318 faces up.

The step (c) includes the following substeps of: (c1) introducing a protective gas into the reacting room 304 to evacuate the air in the reacting room 304; (c2) heating the reacting room 304 up to growing temperature of the ultralong carbon nanotubes 104; and (c3) introducing a carbonaceous gas to grow the ultralong carbon nanotubes 104.

In the step (c1), the protective gas is selected from the group comprising of nitrogen ($N_2$) gas and noble gas. In the present embodiment, the protective gas is argon (Ar) gas.

In the step (c2), the growing temperature of the ultralong carbon nanotubes 104 ranges approximately from 800 to 1000° C. It is to be understood that the growing temperature varies with the carbonaceous gas. In the present embodiment, the carbonaceous gas is ethanol, so the growing temperature of the ultralong carbon nanotubes 104 ranges approximately from 850 to 950° C. If the carbonaceous gas were methane, the growing temperature of the ultralong carbon nanotubes 104 would range approximately from 950 to 1000° C.

In the step (c3), the carbonaceous gas is hydrocarbon with active chemical properties. The carbonaceous gas can be selected from the group comprising of ethanol, ethane, methane, and combinations thereof. In the present embodiment, the carbonaceous gas is ethanol or methane. The flux of the carbonaceous gas ranges approximately from 5 to 100 milliliter per minute. An additional carrier gas such as hydrogen, can be also introduced into the reacting room 304 with the carbonaceous gas. The flux ratio of the carbonaceous gas and the carrier gas ranges approximately from 1:1 to 1:3. After introducing the carbonaceous gas into the reacting room 304, it starts to grow carbon nanotubes under the effect of the catalyst. One end (i.e., the root) of the carbon nanotubes is fixed on the growing substrate 316, and the other end (i.e., the top/free end) of the carbon nanotubes grow continuously. The density of the carbon nanotubes is low due to the catalyst layer 318 including a plurality of monodisperse catalyst grain. Therefore, a part of the carbon nanotubes grow into ultralong carbon nanotubes 104. Because the second supporter 310 disposed in the reacting room 304 is near the gas inlet 306, the ultralong carbon nanotubes 104 float above the receiving substrate 314 with the roots of the ultralong carbon nanotubes 104 still sticking on the growing substrate 316, as the carbonaceous gas is continuously introduced into the reacting room 304. The mechanism of growing ultralong carbon nanotubes 104 is called "kite-mechanism". The length of the ultralong carbon nanotubes 104 depends on the growing time. In the present embodiment, the growing time approximately ranges from 10 minutes to 30 minutes. The length of the ultralong carbon nanotubes 104 approximately ranges from 1 centimeter to 30 centimeters.

In the step (c), after cutting off the supply of the carbonaceous gas into the reacting room 304, the ultralong carbon nanotubes 104 stop growing and land on the receiving substrate 314. The ultralong carbon nanotubes 104 fall down onto the receiving substrate 314 parallel and separately due to the gravity and are allowed to cool. The distance between any adjacent ultralong carbon nanotubes 104 is larger than 20 micrometers. In order to avoid oxidation of the ultralong carbon nanotubes 104, the protective gas should be continuously fed into the reacting room 304 until the temperature of the reacting room 304 is cooled down to room temperature.

In the step (d), a process of removing the ultralong carbon nanotubes 104 from the growing substrate 316 is performed before changing the growing substrate 316 and can be done by a tool such as knife or a laser. Changing the growing substrate 316 can be carried out by providing a new growing substrate with a catalyst layer or recycling the original growing substrate 316. Recycling the original growing substrate 316 is performed by cleaning the original growing substrate 316 and forming a new catalyst layer 318 thereon.

More ultralong carbon nanotubes 104 are caused to fall to the receiving substrate 314 to form a carbon nanotube film 102 by repeating steps (c) as often as desired. The ultralong carbon nanotubes 104 in the carbon nanotube film 102 connect to each other by van der Waals attractive force therebetween to form a free-standing carbon nanotube film structure 10. The carbon nanotube film 102 can be separated directly or after treating with an organic solvent from the receiving substrate 314. It is to be understood that the ultralong carbon nanotubes 104 are removed from the growing substrate 316 before separating the carbon nanotube film 102 from the receiving substrate 314.

Furthermore, a step (e) of forming an offset film is provided after step (d). In step (e), a carbon nanotube film structure 10 including at least two stacked and crossed carbon nanotube film 102 can be obtained by following substeps of: (e1) rotating the receiving substrate 314 by changing the rotation angle of the rotatable supporter 312; (e2) repeating the step (c) and the step (d) to grow ultralong carbon nanotubes 104 many times. Any adjacent carbon nanotube films 102 in the carbon nanotube film structure 10 connect to each other by van der Waals attractive force therebetween to form a free-standing structure.

In order to remove the carbon nanotube film structure 10 from the receiving substrate 314 easily, a step of treating the carbon nanotube film structure 10 with an organic solvent can be optionally provided after step (d) or (e). The organic solvent is volatilizable and can be selected from the group comprising of ethanol, methanol, acetone, dichloroethane, chloroform, and any appropriate mixture thereof. In the present embodiment, the organic solvent is ethanol. Specifically, the carbon nanotube film structure 10 can be treated via applying organic solvent onto the surface of the carbon nanotube film structure 10 or immersing the entire carbon nanotube film structure 10 in an organic solvent. After being soaked by the organic solvent, microscopically, carbon nanotube strings will be formed by some adjacent carbon nanotubes 104 bundling together, due to the surface tension of the organic solvent. In one aspect, due to the decrease of the specific surface area via bundling, the mechanical strength and toughness of the carbon nanotube film are increased and the coefficient of friction of the carbon nanotube films is reduced. In the other aspect, the sticky property of the treated carbon nanotube film structure 10 is reduced, thereby the treated carbon nanotube film structure 10 is easier to remove from the receiving substrate 314.

After the step (e), the carbon nanotube film 102 can be removed from the receiving substrate 314 directly. It is to be understood that the carbon nanotube film structure 10 can be used with the receiving substrate 314 together.

The method of making carbon nanotube film structure 10 has following advantages. Firstly, due to the growing substrate 316 and the receiving substrate 314 is not the same substrate, it avoid introducing the catalyst into the carbon nanotube film structure 10, so the carbon nanotube film structure 10 is pure. Secondly, it is simple to repeating the step of growing carbon nanotube film 102 by changing the growing substrate 316. Thirdly, the extending direction of the ultralong carbon nanotubes 104 in the carbon nanotube film structure 10 can be controlled via changing the rotation angle of the receiving substrate 314. Fourthly, the receiving substrate does not need to be heated at high temperature, thus, the material of the receiving substrate can be selected in a wide range.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the description and the claims may include some indication in reference to certain steps. However, the indication used is applied for identification purposes only, and the identification should not be viewed as a suggestion as to the order of the steps.

What is claimed is:

1. A method for making a carbon nanotube film structure, the method comprising the steps of:
    (a) providing a growing device, the growing device comprising a reacting room having a gas inlet and a gas outlet, a growing substrate, a receiving substrate, a rotatable supporter disposed in the reacting room and a second supporter disposed in the reacting room closer to the gas inlet than the rotatable supporter, wherein a catalyst layer is located on the growing substrate;
    (b) placing the growing substrate on the second supporter, and placing the receiving substrate on the rotatable supporter;
    (c) growing carbon nanotubes from the growing substrate such that the carbon nanotubes are brought above the receiving substrate by a gas flow and deposited onto the receiving substrate by the force of gravity, wherein both the growing and transfer step occur in the reaction room, and the growing carbon nanotubes comprises the steps of introducing a carbonaceous gas along a direction of the gas flow and stopping the introducing the carbonaceous gas, and the carbon nanotubes above the receiving substrate are deposited onto the receiving substrate only by the force of gravity after the stopping the introduction the carbonaceous gas; and
    (d) changing the growing substrate, and growing more carbon nanotubes to form at least two carbon nanotube films on the receiving substrate.

2. The method as claimed in claim 1, wherein the catalyst layer comprises a layer of monodisperse catalyst, and the material of the monodisperse catalyst is selected from the group consisting of iron, cobalt, nickel and any alloy thereof.

3. The method as claimed in claim 2, wherein the method of locating the catalyst layer on the growing substrate comprises the following substeps of:
 (a1) depositing a layer of monodisperse catalyst on the growing substrate; and
 (a2) patterning the layer of monodisperse catalyst to form a patterned catalyst layer.

4. The method as claimed in claim 1, wherein the catalyst layer is made of monodisperse solution of metal or metal-salt.

5. The method as claimed in claim 4, wherein the method of locating the catalyst layer on the growing substrate comprises the following substeps of:
 (a1') forming a monodisperse solution layer by dipping the monodisperse solution onto a surface of the growing substrate or immersing the growing substrate into the monodisperse solution; and
 (a2') drying the monodisperse solution layer to form the catalyst layer.

6. The method as claimed in claim 1, wherein the growing substrate is a silicon strip and the receiving substrate is a wafer or a copper wire mesh.

7. The method as claimed in claim 1, wherein the step (c) comprises the following substeps of:
 (c1) introducing a protective gas into the reacting room to evacuate air in the reacting room;
 (c2) heating the reacting room up to a temperature ranging approximately from 800° C. to 1000° C.; and
 (c3) introducing the carbonaceous gas to grow the carbon nanotubes.

8. The method as claimed in claim 1, further comprising a step of (e) forming a carbon nanotube film that is offset and stacked on the at least two carbon nanotube films, forming the offset film comprises the following substeps of:
 (e1) rotating the receiving substrate by changing a rotation angle of the rotatable supporter; and
 (e2) repeating the step (c).

9. The method as claimed in claim 1, further comprising treating the at least two carbon nanotube films with an organic solvent.

10. The method as claimed in claim 1, further comprising removing the receiving substrate.

11. A method for making a carbon nanotube film structure, the method comprising the steps of:
 (a) providing a growing device, the growing device comprising a reacting room having a gas inlet and a gas outlet, and a first supporter and a second supporter located in the reacting room, wherein the first supporter is located between the gas outlet and the second supporter, and the second supporter is located between the gas inlet and the first supporter;
 (b) placing a growing substrate with a catalyst layer thereon on the second supporter, and placing a receiving substrate on the first supporter;
 (c) flowing a carbonaceous gas along a direction from the gas inlet to the gas outlet;
 (d) heating the reacting room to grow carbon nanotubes from the growing substrate, wherein the carbon nanotubes are long enough to float above the receiving substrate; and
 (e) stopping the flow of the carbonaceous gas so that the carbon nanotubes that are floating above the receiving substrate fall down on the receiving substrate only by the force of gravity, wherein both the growing and transfer step occur in the reaction room.

12. The method as claimed in claim 11, wherein the catalyst layer comprises a layer of monodisperse catalyst.

13. The method as claimed in claim 12, wherein a distance between the first supporter and the second supporter is less than 1 micrometer.

14. The method as claimed in claim 13, wherein the first supporter is lower than the second supporter.

15. The method as claimed in claim 14, wherein in step (d), first ends of the carbon nanotubes are fixed on the growing substrate, and seconds end of the carbon nanotubes grow continuously.

16. The method as claimed in claim 15, wherein the carbon nanotubes float above the receiving substrate with the first ends still fixed on the growing substrate.

17. The method as claimed in claim 16, wherein in step (e), the carbon nanotubes fall onto the receiving substrate to form a carbon nanotube film.

18. The method as claimed in claim 17, further comprising treating the carbon nanotube film with an organic solvent.

19. A method for making a carbon nanotube film structure, the method comprising the steps of:
 (a) providing a growing device, the growing device comprising a reacting room having a gas inlet and a gas outlet, and a rotatable supporter and a second supporter located in the reacting room, wherein the gas inlet, the gas outlet, the rotatable supporter, and the second supporter are located in a straight line with an order of the gas inlet, the second supporter, the rotatable supporter, and the gas outlet;
 (b) placing a growing substrate with a monodisperse catalyst layer thereon on the second supporter, and placing a receiving substrate on the rotatable supporter;
 (c) flowing a carbonaceous gas along a direction from the gas inlet to the gas outlet;
 (d) heating the reacting room to grow first carbon nanotubes from the growing substrate such that the first carbon nanotubes float above the receiving substrate and have first ends fixed on the growing substrate; and
 (e) stopping the flow of the carbonaceous gas so that the first carbon nanotubes floating above the receiving substrate fall onto the receiving substrate only by the force of gravity to form a first carbon nanotube film, wherein both the growing and transfer step occur in the reaction room.

20. The method as claimed in claim 19, further comprising rotating the receiving substrate and repeating the step (c) to step (e) to grow second carbon nanotubes to form a second carbon nanotube film stacked on the first carbon nanotube film.

* * * * *